3,539,757
GAS SHIELDED ARC WELDING TORCH
John K. Young, Chesham, England, assignor to The British Oxygen Company Limited, a British company
Filed July 20, 1967, Ser. No. 654,812
Claims priority, application Great Britain, July 22, 1966, 33,194/66
Int. Cl. B23k 9/16, 9/24
U.S. Cl. 219—75         5 Claims

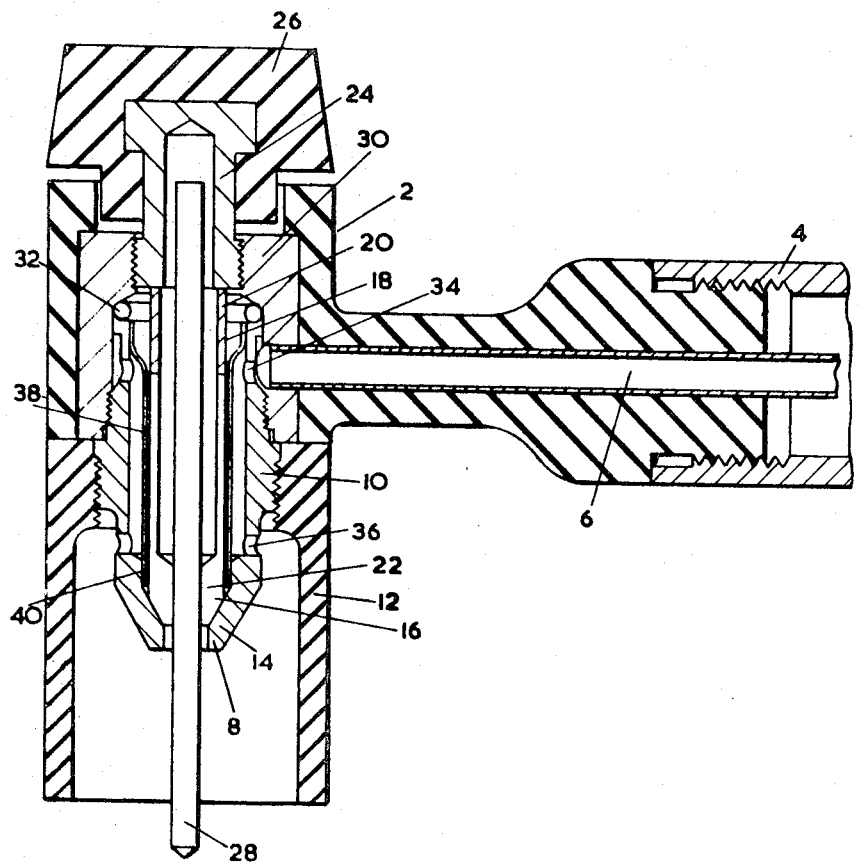

ABSTRACT OF THE DISCLOSURE

The flow of shielding gas through a torch using a non-consumable electrode is made independent of the dimensions or configuration of the electrode or the chuck gripping it by surrounding the chuck by a sealing tube assisting to define flow passages of invariable cross-section.

FIELD OF THE INVENTION

This invention relates to torches for gas-shield arc welding which use a substantially non-consumable electrode rod.

DESCRIPTION OF THE PRIOR ART

In most torches of this kind the electrode rod is arranged to be gripped by a collet chuck which contracts when urged axially into engagement with a tapering surface of a coaxial annual support member. A gas-directing nozzle circumscribes the electrode tip adjacent to the support member and is usually mounted on the support member. Shielding gas is introduced into the torch so as to flow towards the electrode tip through the interior of the support member.

To cause the flow of gas issuing from the nozzle to be laminar arrangements have been adopted in which shielding gas is directed outwardly at the interior wall of the nozzle from within the support member. However this expedient has not been entirely satisfactory because of the axial flow of gas through the spaces between the components of the collet chuck. There is the additional disadvantage that this axial flow is not constant but varies with the different chucks needed for different diameters of electrode.

SUMMARY OF THE INVENTION

The present invention aims at providing a torch from which the flow of gas is substantially independent of differences between the collet chucks used in the torch.

One torch constructed in accordance with the invention will now be described by way of example with reference to the accompanying drawing which shows an axial sectional view of the torch.

As shown in the drawing, the torch comprises a head 2 connected to a hollow handle 4 through which extend an electric cable (not shown) for welding current, and a conduit 6 for arc-shielding gas. Screw-threaded to the head 2 is an annular support member 8 of which one end projects from the head. A screw-threaded portion 10 of member 8 is engaged by a substantially-cylindrical nozzle 12.

At its outer end the support member 8 has a frusto-conical portion 14 which defines a wedging surface 16.

Seated within the member 8 is a collet chuck 18 in the form of a collar 20 from which extends a plurality of resilient fingers 22. The outer surfaces of the ends of the fingers 22 are tapered complementarily to the taper of surface 16.

Screw-threaded in the head 2 is a screw 24 which bears on the collar 20 of the chuck 18. The screw 24 is made of metal, but it is provided with a cap 26 of dielectric material. When the cap 26 is rotated in the clockwise direction the screw bears on the end of the collet chuck to force it axially inwardly so that the fingers 22 of the chuck are forced by their engagement with the surface 16 into gripping engagement with an axially-extending non-consumable electrode 28.

The support member 8 is screwed into a collar 30 forming part of the head 2. The conduit 6 terminates in the collar and an O-ring seal 32 is gripped between one end of the support member 8 and the collar 30 so as to prevent any gas from the condut passing through the gap between the support member 8 and the collar 32.

In the support member 8 is a set of inlet ports 34 and a set of outlet ports 36. The inlet ports 34 place the interior of the support member in communication with the outlet of the conduit 6, while the outlet ports 36 cause gas to flow from the interior of the support member radially outwardly to the interior of the nozzle 12. The gas emerging from the ports 36 is deflected by the interior surface of the nozzle and forms a cylindrical laminar gas shield intended to prevent oxygen from obtaining access to the arc or to the molten metal produced by the arc.

Also positioned internally of the support member 8 is a tubular seal 38 which is substantially cylindrical but which has one end belled outwardly. The narrower end is a fluid-tight fit on a cylindrical stepped surface 40 adjacent to the tapering surface 16, whereas the outer surface of the belled end is a fluid-tight fit on the internal surface of the support member on the side of the inlet ports 34 remote from the nozzle. Because of the shape of the seal 38 and its engagement with the support member 8 it will be appreciated that the seal cooperates with the support member to define an axially-extending annular passage placing the ports 32 and 34 in communication with each other, while sealing off the chuck 16 from these parts. Thus whether or not a chuck is present within the tubular seal 38, and irrespective of the size and shape of the chuck components, the support member 8, the tubular seal 38, and the nozzle form a space of constant dimensions so that the flow of gas from the torch is independent of the size or shape of the collet chuck.

I claim:

1. A welding torch including a collet chuck having at least two jaws; which is axially movable relatively to an annular support member housing the chuck and having internal surfaces effective to cam the chuck jaws into gripping relationship with an axially-extending non-consumable electrode when there is relative movement of the chuck and support member in the appropriate direction; a nozzle which circumscribes one end of the support member and which projects beyond it; a conduit for shielding gas which terminates adjacent to the suport member, and a tubular seal positioned internally of the support member, circumscribing the collet chuck and defining with the support member a passage by which the conduit is in fluid communication with the interior of the nozzle, the tubular seal preventing the flow of shielding gas from the said passage to the interior of the nozzle through the spaces between the jaws of the chuck.

2. The torch claimed in claim 1, in which the support member has in it two ports or sets of ports which are spaced apart axially, one port or sets of ports being an inlet port or ports through which gas passes from the conduit to the interior of the support member, the other port or sets of port being an outlet port or ports through which gas passes from the interior of the support member to the interior of the nozzle.

3. The torch claimed in claim 1, in which the interior of the seal is sealed from direct communication with the outlet of the conduit by means of a resilient sealing member engaged between the support member and a body member connected with the said conduit.

4. The torch claimed in claim 1, in which the rear end of the collet chuck is engaged by a screw which is movable axially relatively to the support member and which has in it a recess for receiving the rear end of an electrode.

5. The torch claimed in claim 2, in which the ends of the tubular seal are of different diameters, one end engaging the support member on that side of the ports remote from the nozzle, and the other end engaging the support member on that side of the ports nearer the nozzle.

References Cited

UNITED STATES PATENTS

| | | | |
|---|---|---|---|
| 2,726,310 | 12/1955 | Brillie | 219—75 |
| 2,876,334 | 3/1959 | Wojciak et al. | 219—130 |
| 2,922,868 | 1/1960 | Hackman et al. | 219—75 |
| 3,005,899 | 10/1961 | Jensen et al. | 219—130 |
| 3,018,360 | 1/1962 | Engel | 219—75 |
| 3,083,290 | 3/1963 | Kennedy | 219—130 |
| 3,238,350 | 3/1966 | Klasson et al. | 219—75 |
| 3,263,056 | 7/1966 | Tallman | 219—75 |
| 3,272,958 | 9/1966 | Hill et al. | 219—75 |
| 2,659,797 | 11/1953 | Anderson et al. | 219—75 |
| 3,261,962 | 7/1966 | Carkhuff et al. | 219—75 |

JOSEPH V. TRUHE, Primary Examiner

L. A. ROUSE, Assistant Examiner